(12) United States Patent
Levy et al.

(10) Patent No.: US 6,923,050 B2
(45) Date of Patent: Aug. 2, 2005

(54) AUTOMATIC CONTROL METHOD, USABLE IN PARTICULAR FOR MAINTAINING THE SLIP OF A TIRE AT AN OPTIMUM LEVEL

(75) Inventors: Georges Levy, Tokyo (JP); Nicolas Fangeat, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/460,007

(22) Filed: Jun. 12, 2003

(65) Prior Publication Data

US 2004/0024514 A1 Feb. 5, 2004

(30) Foreign Application Priority Data

Jun. 13, 2002 (FR) .............................. 02 07399
Jul. 29, 2002 (FR) .............................. 02 09629

(51) Int. Cl.[7] .............................................. B60C 11/24
(52) U.S. Cl. ....................................................... 73/146
(58) Field of Search .............................. 73/146, 146.2, 73/146.3, 146.4, 146.5, 146.8, 9; 701/74; 303/150, 149, 148

(56) References Cited

U.S. PATENT DOCUMENTS

| | | | |
|---|---|---|---|
| 3,980,346 A | | 9/1976 | Leiber ............................ 303/6 |
| 4,794,538 A | * | 12/1988 | Cao et al. ...................... 701/74 |
| 5,343,918 A | * | 9/1994 | Fontaine .................. 152/209.5 |
| 5,402,345 A | | 3/1995 | Kost ....................... 364/426.02 |
| 5,513,907 A | * | 5/1996 | Kiencke et al. ............. 303/150 |
| 5,816,666 A | | 10/1998 | Wiss ....................... 303/113.4 |
| 6,092,415 A | | 7/2000 | Borenius et al. ........... 73/146.2 |
| 6,285,280 B1 | | 9/2001 | Wang .......................... 340/444 |
| 6,550,320 B1 | * | 4/2003 | Giustino ....................... 73/146 |
| 2004/0225423 A1 | * | 11/2004 | Carlson et al. ............... 701/36 |

FOREIGN PATENT DOCUMENTS

| | | |
|---|---|---|
| DE | 4218034 | 12/1993 |
| WO | 9205986 | 4/1992 |
| WO | 0176925 | 10/2001 |
| WO | 0187647 | 11/2001 |

OTHER PUBLICATIONS

Grosch, K. A. Kautschuk und Gummi Kunststoffe Jun. 1996 v49 n 6 p432–441.*
Yamazaki Shun'ichi The Determination of Tire Parameter for Real Time Estimation of Tire and Road Friction 1997 Jpn. Automob. Res. Inst. Inc p165–168.*
Sakai Tomotsugu, Investigation of Lambourne Wear Test Conditions to Evaluate Tire Wear Life, Toyota Motor Corp., proceedings of the International Sessions JSME Spring annual meetig, 1996 vol. 73 p. 33–34.*

* cited by examiner

*Primary Examiner*—Micheal Cygan
*Assistant Examiner*—Andre Allen
(74) *Attorney, Agent, or Firm*—Fitzpatrick, Cella, Harper & Scinto

(57) ABSTRACT

An automatic control method is provided for a phenomenon in which a parameter Y varies as a function of a parameter X according to a course exhibiting a rise, an extremum and a fall, in which the value of the parameter X is automatically controlled to maintain the value of a parameter Y at an optimum value, including the following steps. Estimations or measurements $(X_i, Y_i)$ are determined for at least one pair of values in a coordinate system having an origin. Corresponding values are determined for the slope $\alpha_i$ of the straight line passing through the origin and through $(X_i, Y_i)$. Coefficients $A_p$ are calculated by direct calculation or by a regression from a sufficient number of pairs with $(\alpha_i, X_i)$ so as to model a variation curve $\alpha_i=f(X_i, A_p)$. A target value $X_{Target}$ is calculated by using a predetermined Invariant "Invt". In addition, applications relating to the testing and the functioning of the tires on a vehicle are provided, for example for controlling the grip on braking, with Y being the coefficient of friction and X being the slip of the tire under torque.

21 Claims, 7 Drawing Sheets

AUTOMATIC CONTROL METHOD, USABLE IN PARTICULAR FOR MAINTAINING THE SLIP OF A TIRE AT AN OPTIMUM LEVEL

BACKGROUND OF THE INVENTION

1. Technical Field of the Invention

The invention relates to the automatic controls enabling certain systems to be maintained about a particular operating point. In a preferred application, the invention concerns methods for testing tires. In another preferred application, the invention concerns systems for controlling the stability of a vehicle, more particularly in their function aimed at avoiding locking of the wheels when the brakes are applied, popularly known by the term "ABS", but also in their more sophisticated versions aimed at maintaining the vehicle on a stable path by automatically acting on the brakes of one wheel, such as for example in the systems popularly known by the term "ESP", or by acting on any other actuator (four wheels steering, active anti-roll, . . . ).

2. The Related Art

It is known that the braking of a vehicle will be all the more efficient if the tire tread is made to function at a slip G corresponding to the maximum value of the coefficient of friction. The maximum value of the coefficient of friction is called $\mu_{max}$. But the average driver is not capable of controlling the braking so as to meet this condition.

The first so-called "ABS" brake systems automatically modulated the brake force (actually, the braking actuator generally being now a hydraulic jack, an ABS system modulates the hydraulic pressure) so as to cause the functioning of the tire to oscillate about the maximum grip. This involves exceeding the maximum grip in order to be able to detect it by initiating the locking of the wheel (sudden deceleration of the rotation of the wheel), before reducing the brake force so as to be just below the maximum grip again. The brake force is then automatically increased again until it exceeds the maximum grip, then reduced, and so on.

Nevertheless, this method involves briefly exceeding the slip $G_{max}$ corresponding to the maximum value of the coefficient of friction $\mu_{max}$, whereas the ideal situation would be to approach the target slip by default without ever exceeding it. It is important to note that one calls $G_{max}$, conventionally, not a maximum possible value of the slip, but actually the particular slip at which the friction coefficient has its maximum possible value.

The efficiency of the braking depends on the fineness of the slip variations about the slip corresponding to the maximum coefficient of friction. When efficiency is referred to, the only concern here is the amount of the deceleration, putting aside the major benefit of ABS systems of affording the driver of the vehicle a certain capability to cause the latter to turn during emergency braking. Consequently, in the context of the present invention, braking is considered as being all the more efficient, the shorter the braking distance. The efficiency of such braking is impaired by the periods in which the braking is not at the level of the coefficient of maximum grip, that is to say, during periods of excessive slip and during periods of insufficient slip.

The first so-called "ABS" brake systems, the functioning of which has been mentioned above, had the advantage of automatically adapting to the various tires. This feature is important since it is known for example that the slip of a winter tire at the maximum coefficient of friction is considerably greater than the slip of a summer tire at the maximum coefficient of friction, just as it is known that the slip of a new tire at the maximum coefficient of friction is greater than the slip of a worn tire at the maximum coefficient of friction. Unfortunately, the vibrations caused by this type of automatic control are unpleasant and may even have the effect that the driver releases the pressure on the brake pedal. This generation of brake system is illustrated for example by U.S. Pat. No. 3,980,346, in which an improvement of such a system is described.

This system enables adaptation to various tires. To do this, the pressure is increased in stages. The development of the rotational speed of the wheel is then observed, from which it is then deduced if the pressure needs to be increased or decreased. Such automatic control is "adaptive" but naturally generates vibrations.

At present, vehicle stability control systems automatically modulate the brake force so as to aim at a predetermined target slip, which is supposed to correspond to the maximum coefficient of friction.

In this case, a vehicle brake system therefore aims to maintain a brake force such that the tread functions at the optimum level of slip chosen. Such a system continuously measures the rotational speed of each of the wheels $V_{Tire}$. With a specific algorithm (see for example U.S. Pat. No. 5,402,345), an estimation of the vehicle speed $V_{Vehicle}$ is obtained. An estimation of the instantaneous slip $G=1-V_{Tire}/V_{Vehicle}$ is therefore available. Ideally, as long as this estimated slip remains below the optimum slip, the brake force does not have to be lowered, or may even be automatically increased if a function for automatic brake boosting is activated (see for example U.S. Pat. No. 5,816,666). When the greatest possible brake force is attained, the brake pressure is regulated so as to maintain an optimum slip $G_{max}$, that is to say, the slip corresponding to the maximum coefficient of friction ($\mu_{max}$).

All that remains is to determine the optimum slip. In EP patent application 0503025, this is done from a reference curve giving a value of G to be aimed for as a function of the estimated coefficient of friction $\mu$ and the likewise estimated vehicle speed. An estimation of the coefficient of friction $\mu$ is carried out as follows. When braking in a straight line on a homogeneous ground, the brake force $F_X$ of the tire on the ground is determined from the brake pressure and the construction parameters of the wheel and of its brake. With the knowledge of all the forces $F_X$ applied by all the tires, it is possible to calculate the deceleration of the vehicle, and, therefore, taking account of the vehicle characteristics, the load transfer, and therefore the load variations on each of the wheels. From this, it is possible to deduce an approximation of the vertical load $F_Z$ applied to each tire. An estimation of the coefficient of friction $\mu=F_X/F_Z$ is thus obtained. If the corresponding lateral force $F_y$ is known, by estimation or measurement, a more precise estimation of the coefficient of friction is given by the formula $$\mu = \frac{\sqrt{F_X^2 + F_Y^2}}{F_Z}.$$

In the context of the present invention, these two estimations will be considered as equivalent. Similarly, and this is obvious to a person skilled in the art, in the context of the present invention, everything that has been stated about braking is valid in the case of acceleration; in other words, a braking force is, as regards the considerations relating to grip, equivalent to a driving force, even if, of course, the actuators for modifying these are not the same.

Furthermore, by referring to the aforementioned reference curve, it is established what the reference coefficient $\mu$ for the estimated slip G would be. As long as the current estimated slip is below the target slip, the slip is increased until the slip values substantially coincide. An advantage of this second system is that there are fewer oscillations about the maximum slip than with the first.

Unfortunately, this reference curve is predetermined experimentally, and therefore for a limited number of tires, and is unable to take account of the actual state of the vehicle tire equipment, beyond these conditions of use, for example inflation pressure, level of wear, etc. Although this automatic control principle actually enables the vibrations to be limited or eliminated, the braking efficiency is all the more impaired since the tire actually used intrinsically requires a slip at the maximum coefficient of friction which is very different from that programmed in fact in the reference curve.

SUMMARY OF THE INVENTION

The object of the present invention is to overcome the above-mentioned disadvantages by proposing an automatic control principle, applicable for example to the slip of a tire, which is both self-adaptive, like the first known method explained briefly above, and which aims more positively, with fewer oscillations, like the second method, at an optimum slip, that is to say, without having to exceed the grip limit.

One aim of the present invention is to predict the slip associated with the maximum coefficient of friction $\mu_{max}$ during braking (or under driving force), depending on the actual rolling conditions of the tire under consideration, by means of measurements as simple as possible to acquire on a measuring bench or vehicle, and by means of as small a number of measurements as possible.

The present invention is based on the observations detailed below, enabling the existence of an Invariant to be identified, that is to say, a parameter having a constant value independent both of the tires and of the grounds on which they are used.

In general, the invention relates to a regulating method applicable to any phenomenon exhibiting characteristics explained below. The invention proposes an automatic control method for a phenomenon of which a parameter Y varies as a function of a parameter X according to a course exhibiting a rise, an extremum and a fall, in which the value of the parameter X is automatically controlled to maintain the value of a parameter Y at an optimum value, comprising the following steps:

Determining estimations or measurements $(X_i, Y_i)$ for at least one pair "i" of values;

Determining the corresponding values of the slope $\alpha i$ of the straight line passing through the origin and through (Xi, Yi);

Calculating coefficients Ap by direct calculation or by a regression from a sufficient number of pairs with ($\alpha i$, Xi) so as to model a variation curve $\alpha i = f(Xi, Ap)$;

Calculating a target value $X_{max}$ by using a predetermined Invariant "Invt".

The target value $X_{max}$ is calculated using the modelling formula resulting from the choice of direct calculation or regression. The area of more particular interest below is that concerning the contact of road vehicles with the ground, and the elements or systems which this includes.

The invention proposes a ground contact system in which a characteristic parameter Q of the functioning of a tire on a vehicle in movement varies as a function of a parameter P according to a course exhibiting a rise, an extremum and a fall, the value of the parameter P being directly or indirectly imposed by a controller, acting on at least one of the elements chosen from the group comprising the torque applied to the tire, the steer angle of the tire, the camber angle of the tire and the vertical force applied on the tire, in order to maintain the value of a parameter Q at a chosen value, in which the controller includes means for:

Determining estimations or measurements $(P_i, Q_i)$ for at least one pair "i" of values;

Determining the corresponding values of the slope $\beta i$ of the straight line passing through the origin and through (Pi, Qi);

Calculating coefficients Ap by direct calculation or by a regression from a sufficient number of pairs with ($\beta i$, Pi) so as to model a variation curve $\beta i = f(Pi, Ap)$;

Calculating a target value $P^{Target}$ by using a predetermined Invariant "Invt";

Changing into "active" mode when the absolute value of the difference between $P^{Instantaneous}$ and $P^{Target}$ is more than a predetermined threshold.

Of course, as it is well known in servo-control systems, more specifically in safety systems comprising a servo-control, the use of the invention does not preclude that the controller of the system includes other means than the ones described here, namely other means for calculating a target value $P^{Target}$, for instance, to have a redundancy and/or to use alternate strategies that could be estimated preferable in certain circumstances, e.g., in view of estimated or measured values of $(P_i, Q_i)$.

When the controller switches into active mode, it sends an alarm and/or it acts on the parameter P so as to maintain the value thereof at $P^{Target}$, and/or it acts on any other appropriate parameter.

A first application of the concept of the invention relates to tire or ground tests. It is possible, by carrying out a few measurements in the area in which the curve of the variation of the coefficient of friction $\mu$ as a function of the slip G is rising, while keeping well away from the maximum, to reliably estimate an optimum slip $G^{Opt}$, in particular the slip $G_{max}$ corresponding to the maximum coefficient of friction $(\mu_{max})$.

The invention proposes a method for controlling the functioning of a tire, comprising the following steps:

Determining estimations or measurements $(G_i, \mu_i)$ for at least one pair "i" of values;

Determining the corresponding values of the slope $\alpha i$ of the straight line passing through the origin and through (Gi, $\mu$i);

Calculating coefficients Ap by direct calculation or by a regression from a sufficient number of pairs with ($\alpha_i$, $G_i$) so as to model a variation curve $\alpha_i = f(G_i, A_p)$.

The coefficient of friction may, in the present invention, be estimated as indicated above, or of course in any other way, for example from measurements carried out in the tire or its environment. A modelling (above-mentioned variation curve) of the functioning of the tire in terms of slip is thus obtained, which may have diverse applications. The following describes a preferred, but non-limiting, application relating to the control of the slip at a predetermined optimum level, in particular for example to the control of the slip corresponding to the maximum grip of the tire, applicable as already emphasized both to situations in which the longitudinal force transmitted by the tire is a braking force and to situations in which the longitudinal force transmitted by the tire is a driving force.

Advantageously, an estimation of the optimum slip $G^{Opt}$ is determined by the formula resulting from the choice of direct calculation or the chosen regression, by using a predetermined Invariant "Invt". And in this case, the target value $G^{Opt}$ is calculated, by transposing the general presentation given above, by the modeling formula resulting from the choice of direct calculation or regression.

The invention also proposes methods for testing tires which will be explained below.

It should be noted that, in the context of the present invention, it does not matter whether the tread whose grip characteristic is being dealt with is that of a pneumatic tire or a non-pneumatic elastic outer casing, or else a crawler track. The terms "tread", "tire", "outer casing", "elastic outer casing", "crawler track" or even "wheel" are to be interpreted as equivalent.

In another preferred application, the invention relates to the analysis of the lateral force developed by a tire or elastic outer casing in a region of functioning close to the saturation of the lateral force.

The invention also proposes a method aimed at predicting the value of the lateral slip angle δ (also referred as "drift angle") of a tire where the lateral force (also referred to as "drift thrust") is maximal. It is a question of anticipating when the tire will attain its maximum drift angle δ and will therefore no longer be able to perform its primary function, which is to enable the vehicle to turn, so as to be able to maintain the functioning of the tire at a predetermined target value of the drift thrust $F^{target}$, or to warn the driver. To maintain the functioning of the tire at a predetermined target value, preventive actions may be taken, if necessary automatically, to reduce the vehicle speed in order to avoid critical driving situations (if the vehicle does not turn as the driver desires, an accident may result). The method for controlling the functioning of a tire proposed by the invention, including a phase for predicting the value of the drift angle δ of a tire where the lateral force is maximal, comprises the following steps:

Determining estimations ($δ_i$, $F_i$) for at least one pair "i" of values;

Determining the corresponding values of the slope αi of the straight line passing through the origin and through (δi, Fi);

Calculating coefficients Ap by direct calculation or by a regression from a sufficient number of pairs with ($α_i$, $δ_i$) so as to model a variation curve αi=f(δi, Ap).

A modelling (above-mentioned variation curve) of the functioning of the tire in terms of drift is thus obtained, which may have diverse applications. The following describes a preferred, but non-limiting, application relating to the control of the drift angle so as to properly utilize the drift thrust potential of the tire. In this case, the method additionally comprises the following steps:

Calculating a value of the drift angle $δ^{Opt}$ by using a predetermined Invariant "Invt";

Producing a warning signal when the drift angle δ is close to $δ^{Opt}$.

Besides the methods for testing tires, the invention also concerns the systems for controlling the stability of a vehicle. This refers both to the function aimed at avoiding the locking of the wheels when the brakes are applied, popularly known by the term "ABS", or else aimed at automatically increasing the brake force as far as the physically possible limit, and also more sophisticated versions of the system for controlling the stability of a vehicle aimed at maintaining the vehicle on a stable path by automatically and selectively acting on the brakes of one wheel and/or by automatically acting on the steering of steered wheels or on any other actuator enabling the behaviour of the vehicle to be influenced.

BRIEF DESCRIPTION OF THE DRAWINGS

The invention will be explained in more detail below with reference to the attached figures, in which.

DETAILED DESCRIPTION OF EXEMPLARY EMBODIMENTS

The present invention is based on the following observations.

Figure 4:
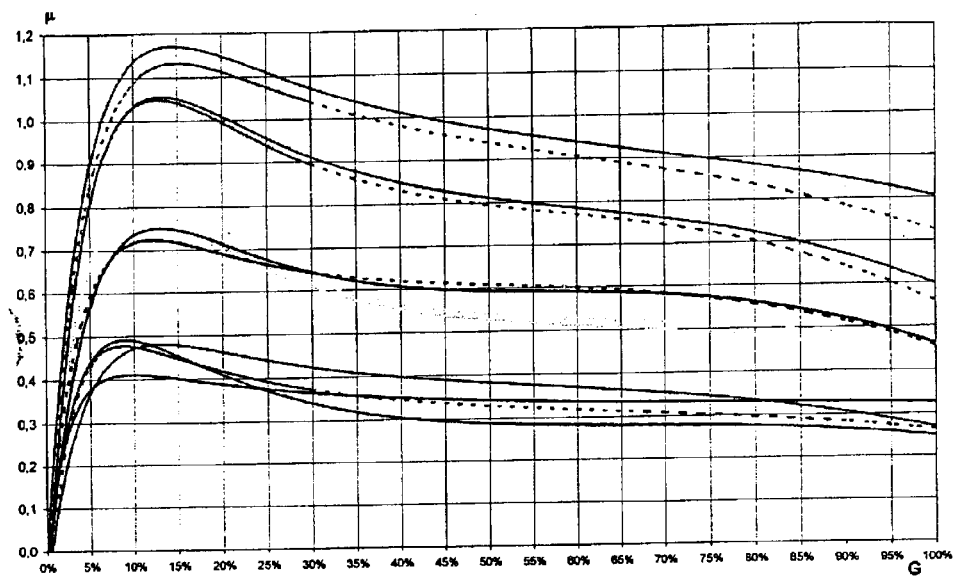
FIG. 4 shows several plots of the variation of the coefficient of friction μ with respect to the slip G for the same tire under various test conditions.

FIG. 4 shows various curves of the coefficient of friction μ as a function of the slip G for the same MICHELIN XH1

Figure 5:
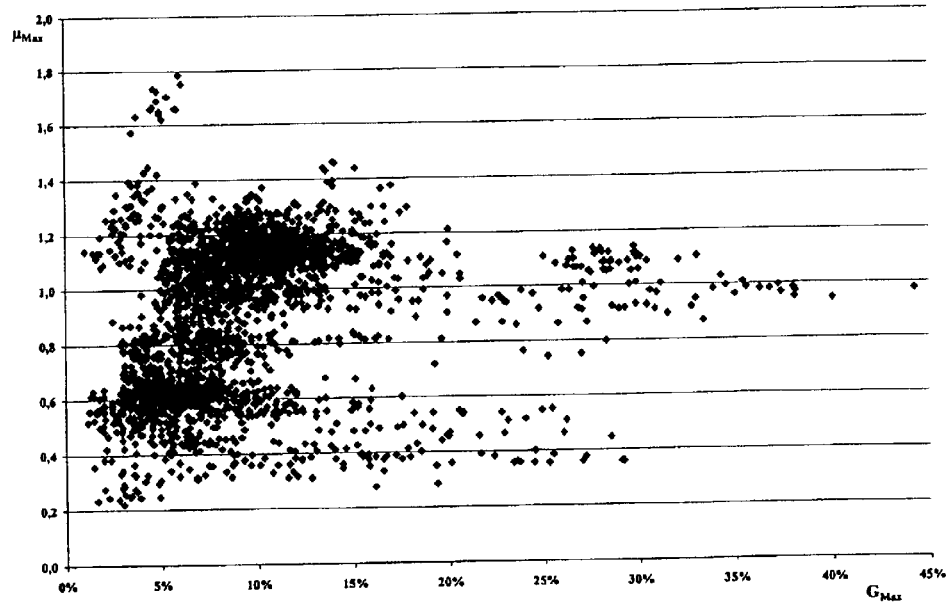
FIG. 5 shows the position of the coefficients of friction $μ_{max}$ and of the associated slips $G_{max}$ for numerous tires and different test conditions.

195/65-15 tire tested on various grounds at an inflation pressure of 2 bars. FIG. 5 shows the location of the coefficients of friction $\mu_{max}$ and the corresponding slip, for a very large number of tests corresponding to different tires, different grounds and different test conditions in terms of speed, tire load, etc. It can be seen that it is difficult, if not illusory, to find a regression enabling the physical phenomena of grip to be grasped correctly using such an approach, since the values are widely scattered.

Figure 6:
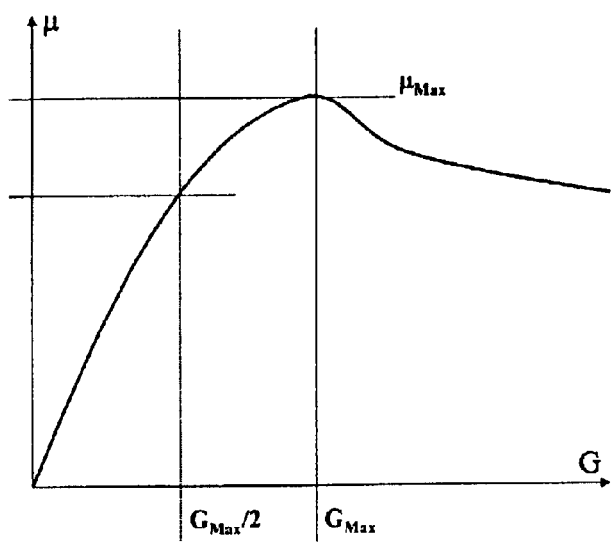
FIG. 6 shows a typical schematic curve of the variation of the coefficient of friction μ with respect to the slip G, in which two particular points have been marked: the coefficient of friction $μ_{max}$ and its associated slip $G_{max}$, and the conventional point corresponding to the coefficient of friction μ50%, prevailing at 50% of the slip $G_{max}$, marked conventionally by $G_{max/2}$.

The applicants have therefore pursued their investigations in a manner which will be explained. Analysis of the quotient $\mu/G$ calculated for $G=G_{max}$ and for $G=G_{max}/2$, also denoted "50%", (see FIG. 6) is carried out.

Figure 7:
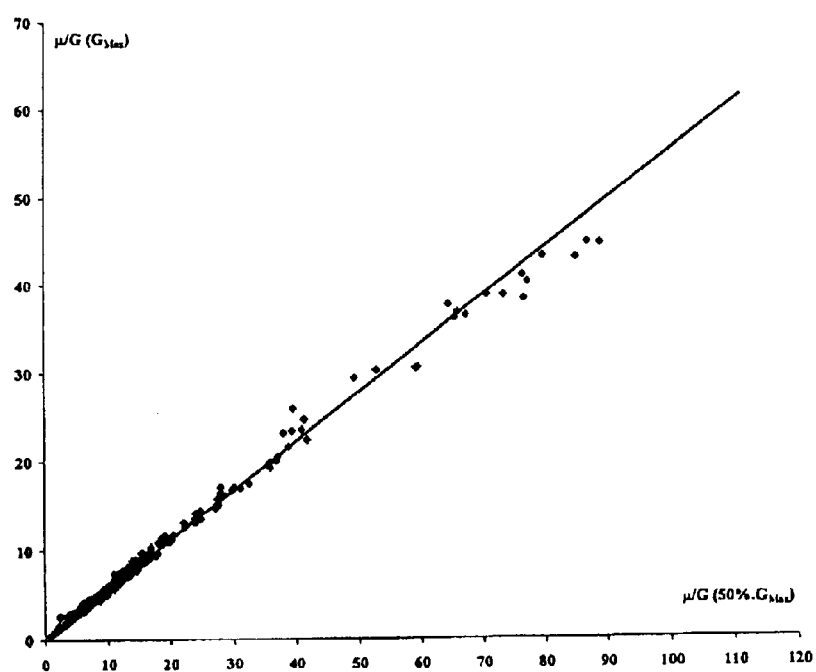
FIG. 7 shows the position of the points corresponding, in ordinates, to the quotient μ/G (at $G_{max}$) of the coefficient of friction $μ_{max}$ for the slip G associated with the coefficient of friction $μ_{max}$ and quotients μ/G (at 50% of $G_{max}$) of the value of the coefficient of friction μ at and for the slip at 50% of the slip associated with the coefficient of friction $μ_{max}$, for numerous tires and different test conditions.

FIG. 7 shows the values of the ratio $\mu_{max}/G_{max}$ as a function of the ratio $\mu/G_{at\ 50\%\ of\ max}$ for about 400 tests, i.e., 3000 measurements in total before determining a mean value. FIG. 7 reflects multiple ground conditions and different tires, and test conditions (load, speed, pressure) which are themselves variable. It enables an appreciation to be gained of the excellent experimental verification of the Invariant "Invt" presented above.

It is found that, whatever the tires under consideration and the test conditions are:

$$\frac{\frac{\mu}{G}(G=G_{max})}{\frac{\mu}{G}(G=G_{max}/2)} \approx 0.58 \qquad \text{Eq. (1)}$$

The above ratio is an Invariant denoted "Invt" herein below.

Figure 8:
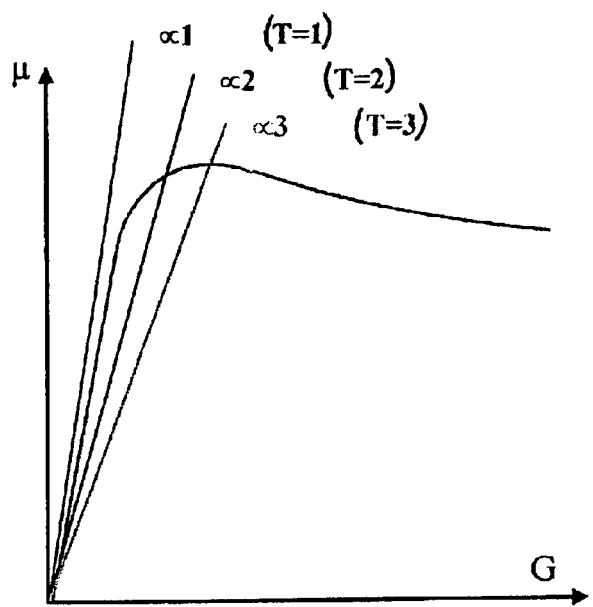
FIG. 8 shows a typical schematic curve of the variation of the coefficient of friction μ with respect to the slip G and shows the course of the secants α passing through the origin and the curve for three particular slips.

Next, the mean slope of the curve $\mu(G)$ (see FIG. 8) is considered. Let us call this slope $\alpha$. It holds that:

$$\mu = \alpha \cdot G \qquad \text{Eq. (2)}$$

Figure 9:
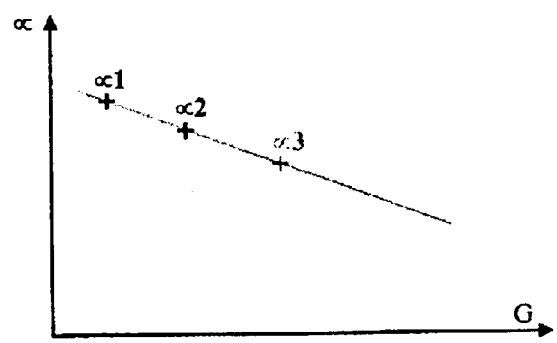
FIG. 9 shows a typical schematic curve of the linear variation as a function of the slip G of the slope of the secant passing α through the origin and the point of the curve of the variation of the coefficient of friction at the same slip.

It is assumed that this slope varies linearly with G (which is a good approximation at least in the first part of the curve). It is therefore possible to calculate the equation of the straight line $\alpha(G)$ (assuming a linear variation, see FIG. 9):

$$\alpha = a \cdot G + b \qquad \text{Eq. (3)}$$

By virtue of this equation and the Invariant "Invt" described in the previous section, it is possible to write:

$$a \cdot G_{max} + b = Invt \cdot \left(a \cdot \frac{G_{max}}{2} + b\right) \qquad \text{Eq. (4)}$$

From this, the $G_{max}$ is thus deduced, which is the target to be aimed at by a vehicle brake system controller, and is, according to the invention:

$$G_{max} = -\frac{b}{a} \cdot \frac{1-Invt}{1-\frac{Invt}{2}} \qquad \text{Eq. (5)}$$

The principle enabling $G_{max}$ to be calculated (more exactly the effective slip when the tread functions at the coefficient of friction $\mu_{max}$) makes it possible to determine the value of the target G whatever the tire type is, whatever its degree of wear or aging is, and whatever the tire use conditions are.

Figure 10:
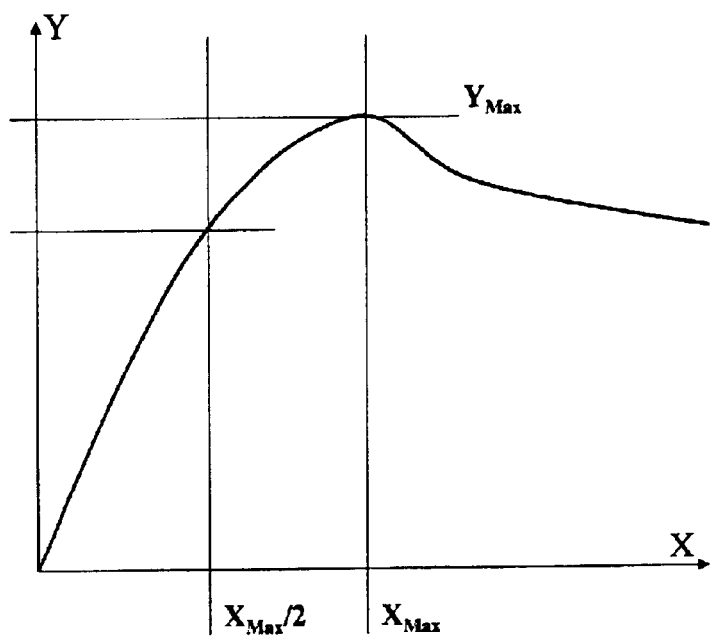
FIG. 10 shows a curve of general application to a phenomenon involving the variation of Y with respect to X, exhibiting a maximum of Y for a particular X, and a monotonic rise at the maximum of Y.
Figure 11:
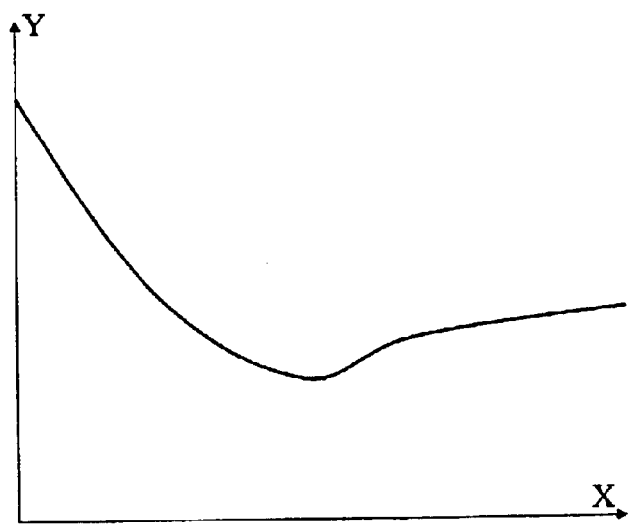
FIG. 11 shows a curve of general application to another variation phenomenon basically like the previous one.

Since the above observations are based on the curves of the variation of the coefficient of friction as a function of the slip, they remain valid for any phenomenon involving the variation of one parameter as a function of another, provided that it has a similar characteristic curve. The invention therefore proposes an automatic control procedure valid for a parameter X when there exists a parameter Y such that the curve of Y(X) has a course shown in FIG. 10, or for any variation phenomenon which has such a curve after simple transformations, such as a translation, a homothetic transformation, a reversal and any combination of these same transformations (see FIG. 11 which illustrates the combination of a translation and a reversal to be carried out before returning to the same course of the curve as that in FIG. 10).

In addition, although Eq. (3) shows that a linear regression enables the evolution of the variation of the coefficient of friction $\mu$ as a function of the slip G to be modelled very correctly, it has been found that the precision of the proposed procedure is improved if a judicious choice is made of the most appropriate type of regression. Thus, the choice of the appropriate type of regression is included in the invention, which proposes in general a regulating procedure as explained below.

The invention therefore applies to any physical phenomenon possessing the following properties:

Measured or estimated control parameter X.

Measured or estimated parameter Y which depends on the value of X for a given environment of the following form: presence of a maximum $Y_{max}$; Y(0) low and much less than $Y_{max}$ (a factor 10 at least must separate the values Y(0) and $Y_{max}$; Y(X) continuously increasing up to $X_{max}$.

The aim is to maximize the value of Y as quickly as possible, for a process Y(X) starting for low Xs. A robust algorithm is proposed here which enables in particular the maximum to be obtained without knowledge a priori thereof and without the need to exceed it, in a context of actual measurement (or estimation) (generally affected by a noise at the input X and the output Y). The method does not require the absolute value of Y.

Use is made of the following observations:

An underlying relationship exists between the secant at the maximum (in $X_{max}$) and the secant in $X=X_{max}/2$. The typical relationship is a constant quotient (Invariant). This Invariant must be determined on each application of the method to a particular phenomenon.

A practical, non-limiting, method for determining the Invariant is as follows:

$$Invt = \frac{\frac{Y}{X}(X_{max})}{\frac{Y}{X}(p \cdot X_{max})} \qquad \text{Eq. (6)}$$

where the value of p is always positive and less than 1. Advantageously, the value of p is between 0.25 and 0.75. The lower the value of p, the less precise is the method but the greater is the reactivity of the automatic control. Conversely, the greater the value of p, the greater is the precision, but the lower is the reactivity since the final acquisition is too close to the maximum. This is why a preferred value of p is 0.5.

It will always hold that: $0<Invt\leq 1$. The quantity "Invt", presented above as an intrinsic Invariant in the physical phenomenon under consideration, becomes in practice a degree of freedom which enables the algorithm to be finely adjusted by offering an adjustment variable in the refinement of a particular system, for any application to a particular field.

Typically, the following will be considered as first approximation:

$$Invt = \frac{\frac{Y}{X}(X_{max})}{\frac{Y}{X}\left(\frac{X_{max}}{2}\right)} \quad \text{Eq. (7)}$$

The variation of the secant as a function of X may be adjusted by a simple interpolation curve (typically linear or exponential, or even power). An adjustment can be carried out in real time. It is then possible to deduce therefrom the position of the maximum $X_{max}$ before it is attained (extrapolation).

Other types of regressions for the relationship of the secant as a function of X may be used, in which case it is advisable to solve the corresponding system (Eq. (7) is a linking of the value of the secant at the maximum to the half value) to obtain the analytical or approximation formula of the $X_{max}$. A scale error on Y (for example Y is systematically overestimated by 50%) does not change the predicted value of $X_{max}$, and this gives the scale effect a very advantageous low sensitivity.

The intention is to rely on Invariants of the physical curve to deduce the maximum by "measuring" as one goes along during the "rise" towards the maximum, by using all of the relevant information available.

Figure 1:
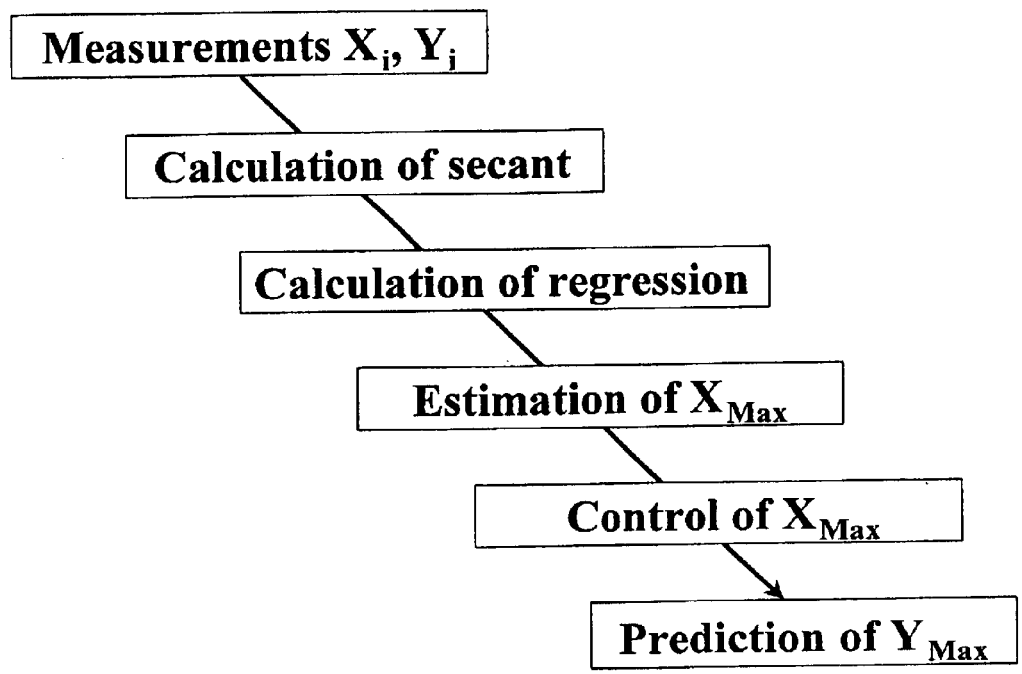
FIG. 1 is a block diagram showing the automatic control procedure according to the invention.
Figure 2:
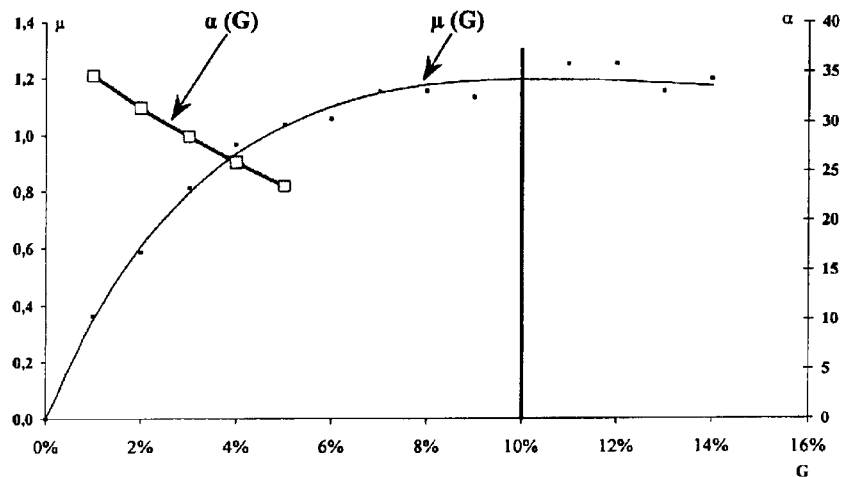
FIG. 2 is a curve of the variation of the coefficient of friction μ with respect to the slip G and the variation at the same slip of the secant α passing through the origin and the point of the previous curve at the same slip.

FIG. 1 illustrates the proposed algorithm, the main steps of which are as follows:

1. Acquisition of the points (Xi, Yi), by measurement or estimation, according to the practical possibilities. It is advisable to acquire at least 2 points. It is ensured that $X_i$ is significantly non-zero, and a minimum threshold may be imposed here to eliminate values which are too low to be relevant.

2. Calculation of the secant, with the previous values the value of the secant is evaluated by direct calculation $\alpha_i = Y_i/X_i$, or by carrying out a suitable regression, for example linear:

$$\Sigma_{XX} = \sum X_j^2, \quad \Sigma_{XY} = \sum X_j \cdot Y_j, \quad \alpha_i = \frac{\Sigma_{XY}}{\Sigma_{XX}} \quad \text{Eq. (8)}$$

considering all the subscript points less than or equal to i so as to eliminate the noise. This is because the linear regression is by nature much less sensitive to the measurement noise on each individual point, the disturbances tending to "cancel each other out" if a sufficient number of points are considered (cf. basic statistical properties). This approach is particularly advantageous since, unlike in the past, it is not the individual values which are of interest (imprecise since noisy) but tendencies emerging from a plurality of values. The pairs ($\alpha_i$, $X_i$) are therefore obtained.

3. Calculation of the regression with ($\alpha_i$, $X_i$), a regression is calculated from a sufficient number "n" of points measured or estimated, typically 5 points, although this must be refined according to the physical phenomenon in question and according to the noise level).

Case of a linear regression:

$$A^{Lin} = \frac{n \cdot \sum X \cdot \alpha - \sum X \cdot \sum \alpha}{n \cdot \sum X^2 - (\sum X)^2}, \quad \text{Eq. (9)}$$

-continued $$B^{Lin} = \frac{\sum \alpha \cdot \sum X^2 - \sum X \cdot \alpha \cdot \sum X}{n \cdot \sum X^2 - (\sum X)^2}$$

Case of an exponential regression:

$$A^{Exp} = \frac{n \cdot \sum X \cdot \text{Ln}(\alpha) - \sum X \cdot \sum \text{Ln}(\alpha)}{n \cdot \sum X^2 - (\sum X)^2}, \quad \text{Eq. (10)}$$

$$B^{Exp} = \frac{\sum \text{Ln}(\alpha) \cdot \sum X^2 - \sum X \cdot \text{Ln}(\alpha) \cdot \sum X}{n \cdot \sum X^2 - (\sum X)^2} \quad \text{Eq. (11)}$$

A and B are therefore obtained by the most suitable regression. Other regressions than the ones indicated might be used, the various regressions to be considered are well known to a person skilled in the art, who will be able to obtain the coefficients of the selected regression.

4. An estimation of $X_{max}$ is then calculated:

For the case of a linear regression, the following is obtained:

$$X_{max} = -\frac{B^{Lin}}{A^{Lin}} \cdot \frac{1 - Invt}{1 - p \cdot Invt}, \quad \text{Eq. (12)}$$

with $\alpha = A^{Lin} \cdot X + B^{Lin}$

For the case of an exponential regression, the following is obtained:

$$X_{max} = \frac{\text{Ln}(Invt)}{p \cdot A^{Exp}}, \quad \text{Eq. (13)}$$

with $\alpha = e^{A^{Exp} \cdot X + B^{Exp}}$

5. When $X_{max}$ is known, according to the particular use of the method, the most appropriate parameter is acted upon. For example, the value of the parameter X is automatically controlled so as to maintain the value thereof at $X_{max}$.

6. It is also possible, although not always useful, to go as far as calculating an estimation of $Y_{max}$:

For the case of a linear regression, in addition $Y_{max}$ is determined as follows, where $Y^{coeff\_lin}$ is an experimentally adjusted coefficient:

$$Y_{max} = Y^{Coeff\_lin} \cdot X_{max} \cdot (A^{Lin} \cdot X_{max} + B^{Lin}) \quad \text{Eq. (14)}$$

For the case of an exponential regression, in addition $Y_{max}$ is determined as follows, where $Y^{coeff\_exp}$ is an experimentally adjusted coefficient:

$$Y_{max} = Y^{Coeff\_exp} \cdot X_{max} \cdot e^{A^{Exp} \cdot X_{max} + B^{Exp}} \quad (15)$$

Example of calculation of $Y_{max}$:

Linear: $\quad Y_{max} = \frac{X_{max}}{0.75} \cdot (A^{Lin} \cdot X_{max} + B^{Lin}) \quad \text{Eq. (16)}$ Exponential: $\quad Y_{max} = \frac{X_{max}}{1.19} \cdot e^{A^{Exp} \cdot X_{max} + B^{Exp}} \quad \text{Eq. (17)}$ It may be useful to make a small correction to the predicted value of $Y_{max}$ since the curvature around the maximum does not correspond exactly to the type of function considered for the approximation of the secant. The coefficient of correction ($1/0.75 = Y^{Coeff\_lin}$ in the linear case, or $1/1.19 = Y^{Coeff\_Exp}$ in the exponential case) is to be adjusted experimentally case by case, according to the application of the invention.

Some possible applications of the invention will now be examined in more detail, the rest of the description being neither limiting nor exhaustive.

EXAMPLE 1

Automatic Maintenance of the Functioning of a Tire at a Certain Coefficient of Friction, for Example at the Maximum Coefficient of Friction $\mu_{max}$ Let us return to the application example concerning the longitudinal grip: $\mu(G)$. In this case, as already explained in the introductory section of this specification, Y is the coefficient of friction $\mu$ of the tire, that is to say, the quotient of the longitudinal force, for example driving force or braking force, divided by the applied vertical force, that is to say, the load applied to the tire, and X is the rate of slip G of the tire (G=0% when there is no slip between the speed of the tire and the speed of the vehicle, that is to say, if the tire rolls freely, and G=100% if the tire is rotationally locked). Typically, depending on the environment (nature of the ground (asphalt, concrete), dry or wet (water level), temperature and level of wear of the tire), the value of $\mu$ as a function of the slip G may vary enormously ($\mu$ is about 0.15 on ice and about 1.2 on a dry ground). Reference may be made to FIG. 4 showing several curves of $\mu$ as a function of the slip G for a new XH1 195/65R15 measured in a load and speed condition.

The method for controlling the functioning of a tire proposed by the invention, whether for a measurement or an application on a vehicle, enables in particular automatic control of the slip G so as to maintain it at predetermined optimum value $G^{Opt}$. The predetermined slip $G^{Opt}$ is chosen, more particularly and in a non-limiting manner, such that the predetermined value of the coefficient of friction corresponds substantially to the value $\mu_{max}$. In this case, it is customary to name this particular optimum value $G_{max}$.

It is found that the position of the maximum for this tire varies depending on the ground. In addition, sometimes there is no unity. For the same maximum level attained, it is possible to have two corresponding slips. Nevertheless, there exists an Invariant "Invt" shared by these curves.

By applying the equation for determining the Invariant to the case of the analysis of the coefficient of friction as a function of the slip, the Invariant is calculated in particular as follows:

$$Invt = \frac{\frac{\mu}{G}(G_{max})}{\frac{\mu}{G}(p \cdot G_{max})}, \quad \text{See, Eq. (6)}$$

with p having a positive value less than 1.

As far as p is concerned, just as explained above, its value is preferably between 0.25 and 0.75, for example it is 0.5, the reader being referred to the general presentation above as regards the consequences of the choice of the value of p.

The following is thus obtained:

$$\frac{\frac{\mu}{G}(G = G_{max})}{\frac{\mu}{G}(G = G_{max}/2)} \approx 0.58 \quad \text{See, Eq. (1)}$$

An Invariant "Invt" has been introduced by processing the data at a first value of a parameter X, for example the slip G, corresponding to the maximum of another parameter Y, for example the coefficient of friction $\mu_{max}$, and at a second value corresponding to 50% of the first value, for example 50% of the aforementioned slip. It has been seen that the choice of processing at 50% is arbitrary and that, if processing is performed at 25% or at 75% of the slip corresponding to the coefficient of friction $\mu_{max}$, an Invariant may also be obtained. This choice is therefore part of the experimental phase particular to each specific application.

It is then advisable to determine the slope $\alpha_i$. This is done by direct calculation $\alpha_i = \mu_i/G_i$ (See, Eq. (2)), or a suitable regression is used, for example a linear regression as follows:

$$\Sigma_{GG} = \sum G_j^2, \quad \Sigma_{G\mu} = \sum G_j \cdot \mu_j, \quad \alpha_i = \frac{\Sigma_{G\mu}}{\Sigma_{GG}} \quad \text{See, Eq. (8)}$$

Or two particular coefficients $A_p$, A and B, are calculated by the following linear regression, applied to "n" measured or estimated points:

$$A^{Lin} = \frac{n \cdot \sum G \cdot \alpha - \sum G \cdot \sum \alpha}{n \cdot \sum G^2 - (\sum G)^2}, \quad \text{See, Eq. (9)}$$

$$B^{Lin} = \frac{\sum \alpha \cdot \sum G^2 - \sum G \cdot \alpha \cdot \sum G}{n \cdot \sum G^2 - (\sum G)^2}$$

Next, where a linear regression is being used, $G^{Opt}$ is calculated as follows:

$$G^{Opt} = -\frac{B^{Lin}}{A^{Lin}} \cdot \frac{1 - Invt}{1 - p \cdot Invt}, \quad \text{See, Eq. (12)}$$

with $\alpha = A^{Lin} \cdot G + B^{Lin}$

If necessary, it is possible to carry on as far as the determination of the value of $\mu$ corresponding to $G^{Opt}$, as follows, where $\mu^{Coeff\_lin}$ is an experimentally adjusted coefficient:

$$\mu = \mu^{Coeff\_lin} \cdot G^{Opt} \cdot (A^{Lin} \cdot G^{Opt} + B^{Lin}) \quad \text{See, Eq. (14)}$$

The following table, determined with a linear approach for the secant, illustrates the calculation of the maximum slip from actual measurements on the same MICHELIN XH1 195/65-15 tire tested on various grounds at an inflation pressure of 2 bars:

| # Ground | 1 | 2 | 3 | 4 | 5 | 6 | 7 | 8 | 9 | 10 | 11 | 12 |
|---|---|---|---|---|---|---|---|---|---|---|---|---|
| Actual $G^{max}$ | 10% | 11% | 11% | 13% | 13% | 13% | 12% | 13% | 9% | 9% | 15% | 15% |
| Actual $\mu^{max}$ | 0.41 | 0.78 | 0.79 | 1.06 | 1.05 | 0.75 | 0.72 | 0.48 | 0.49 | 0.48 | 1.17 | 1.13 |
| Measured $A^{Lin}$ | −64 | −109 | −105 | −108 | −110 | −76 | −77 | −60 | −81 | −127 | −97 | −88 |
| Measured $B^{Lin}$ | 11 | 19 | 18 | 22 | 22 | 15 | 15 | 11 | 13 | 16 | 22 | 20 |
| Predicted $G_{max}$ | 10% | 11% | 11% | 12% | 12% | 13% | 12% | 12% | 10% | 8% | 14% | 14% |
| Predicted $\mu_{max}$ | 0.41 | 0.75 | 0.76 | 1.03 | 1.03 | 0.73 | 0.71 | 0.48 | 0.48 | 0.48 | 1.16 | 1.12 |

Or else, two particular coefficients $A_p$, A and B, are calculated by the following exponential regression:

$$A^{Exp} = \frac{n \cdot \sum G \cdot \text{Ln}(\alpha) - \sum G \cdot \sum \text{Ln}(\alpha)}{n \cdot \sum G^2 - (\sum G)^2}, \quad \text{See, Eq. (10)}$$

$$B^{Exp} = \frac{\sum \text{Ln}(\alpha) \cdot \sum G^2 - \sum G \cdot \text{Ln}(\alpha) \cdot \sum G}{n \cdot \sum G^2 - (\sum G)^2} \quad \text{See, Eq. (11)}$$

Next, where an exponential regression is being used, $G^{Opt}$ is calculated as follows:

$$G^{Opt} = \frac{\text{Ln}(Invt)}{p \cdot A^{Exp}}, \quad \text{See, Eq. (13)}$$

with $\alpha = e^{A^{Exp} \cdot G + B^{Exp}}$

If necessary, it is possible to carry on as far as the determination of $\mu_{max}$, as follows, where $\mu^{coeff\_exp}$ is an experimentally adjusted coefficient:

$$\mu_{max} = \mu^{Coeff\_exp} \cdot G^{Opt} \cdot e^{A^{Exp} \cdot G^{Opt} + B^{Exp}} \quad \text{See, Eq. (15)}$$

This principle may be applied to determine the maximum grip for any type of tire and for any type of ground, which proves to be very advantageous for industrial tire tests.

The proposed method is self-adaptive and very robust since only the variation of the coefficient of friction is dealt with and not its absolute value. It has been found that the sensitivity to noise is very low.

Figure 12:
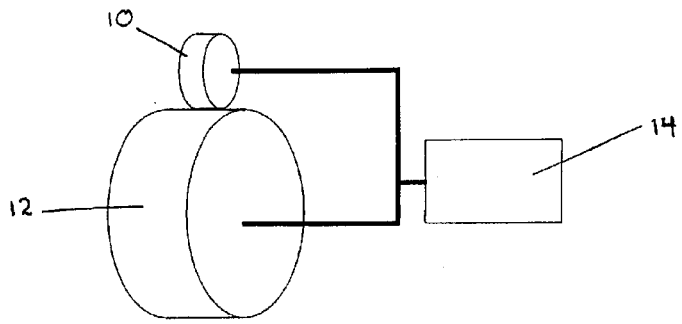
FIG. 12 is a diagrammatic representation of a test apparatus in which a tire rolls on a test wheel.

The intrinsic nature of the above method applied to the longitudinal grip of a tire as a function of its slip means that it is very particularly suited to conducting tire tests, and even more so to constructing simulations. In particular, it is most especially suited to the modelling of the grip of a tire in a vehicle brake system. A representative test apparatus is illustrated diagrammatically in FIG. 12, including a test tire 10 rolling on a test wheel 12 under the control of a programmed controller 14.

Figure 13:
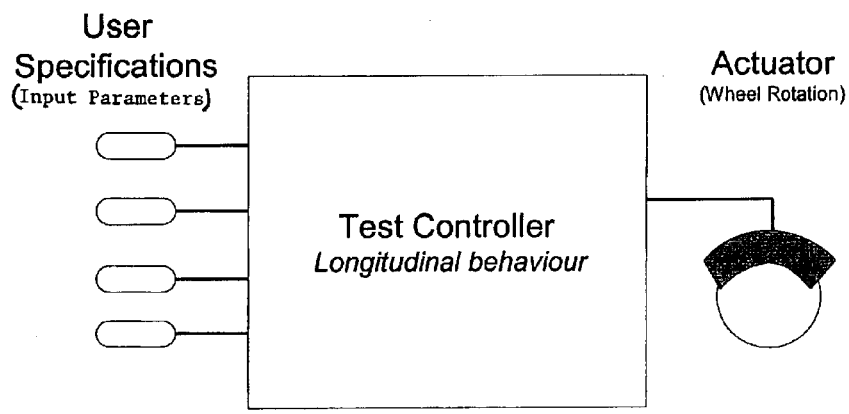
FIG. 13 is a diagrammatic representation of the control of a test machine in slip conditions.

In the tire industry, the invention may be applied to the testing or measuring of tires. One aspect of the invention is therefore a method for testing a tire in terms of slip, illustrated diagrammatically in FIG. 13, comprising the following steps:

Causing the tire to roll on a selected ground (it may be a road, a test track, a test machine having a flat track or comprising a wheel), Applying a predetermined load $F_{Z1}$ to the tire, Applying a predetermined slip to the tire (acting on the relative speed between the tire and the ground), such that the tire remains below the grip limit, Measuring or estimating the longitudinal stresses $F_{x1}$ of the tire, Calculating a value of the coefficient of friction $\mu_1 = F_{x1}/F_{z1}$, Repeating the previous steps for calculating at least one other value "i" of the coefficient of friction $\mu_i$ for at least one other pair "i" of stresses $F_{x1}/F_{z1}$ and measuring the associated slip $G_i$, Determining for each of the calculated values of the coefficient of friction the slope $\alpha_i$ of the straight line passing through the origin and through $(G_i, \mu_i)$.

Calculating coefficients $A_p$ by direct calculation or by an appropriate regression from a sufficient number of pairs with $(\alpha_i, G_i)$ so as to model a variation curve $\alpha_i = f(G_i, A_p)$.

Calculating an optimum slip enabling a predetermined value of the coefficient of friction $G^{Opt}$ to be attained, by using a predetermined Invariant "Invt".

Causing the tire to roll on a selected ground (it may be a road, a test track, a test machine having a flat track or comprising a wheel), Applying a predetermined load $F_{z1}$ to the tire, Applying a predetermined slip to the tire (acting on the relative speed between the tire and the ground), such that the tire remains below the grip limit, Measuring or estimating the longitudinal stresses $F_{x1}$ of the tire, Calculating a value of the coefficient of friction $\mu_1 = F_{x1}/F_{z1}$, Repeating the previous steps for calculating at least one other value "i" of the coefficient of friction $\alpha_i$ for at least one other pair "i" of stresses $F_{x1}/F_{z1}$ measuring the associated slip $G_i$, Determining for each of the calculated values of the coefficient of friction the slope $\alpha_i$ of the straight line passing through the origin and through $(G_i, \mu_i)$ Calculating coefficients $A_p$ by direct calculation or by an appropriate regression from a sufficient number of pairs with $(\alpha_i, G_i)$ so as to model a variation curve $\alpha_i = f(G_i, A_p)$, Calculating an optimum slip enabling a predetermined value of the coefficient of friction $G^{Opt}$ to be attained, by using a predetermined Invariant "Invt".

Of course, as the reader will have appreciated, the Invariant may be chosen by experimentally refining the test method. It may be advantageous, for example for choosing a first value of the Invariant during refinement, to determine the Invariant as follows:

$$Invt = \frac{\frac{\mu}{G}(G_{max})}{\frac{\mu}{G}(p \cdot G_{max})}, \qquad \text{See, Eq. (6)}$$

with p having a positive value less than 1.

In a manner similar to that explained above, two particular coefficients $A_p$, the coefficients A and B, may be calculated by a regression chosen from the group consisting of a linear regression and an exponential regression.

Once again, a value of between 0.25 and 0.75, typically 0.5, may be adopted as the value of p.

EXAMPLE 2

Determination of the Optimum Slip on Braking or Under a Driving Force

It is known that while a vehicle brake system is efficient, it is however optimized for a limited number of tires, chosen by the manufacturer, and that it does not adapt to the tires actually fitted on the vehicle. In particular, it does not adapt to winter tires, which, as is known, moreover, behave radically differently, in particular the grip and the slip at force $F_x$ on the given ground. Consequently, the efficiency of a vehicle brake system could be improved if it could automatically adapt to the tires actually used on the vehicle.

The invention, therefore, extends to a system for controlling the stability of a vehicle, including means for imparting a slip to a tire intended to roll on the ground, means for modulating the slip (acting on the speed of the wheel), and comprising a controller using at least the parameter slip $G^{Opt}$ corresponding to a predetermined value of the coefficient of friction $\mu$, the controller including means for calculating the parameter(s) as follows:

On each activation of the means for imparting a slip to the tire, for at least two different levels "i" of the slip $G_i$ on condition that there is no loss of grip, determining the values of the coefficient of friction $\mu_i$, Determining the slope $\alpha_i$ of the straight line passing through the origin and through $(G_i, \mu_i)$, Calculating coefficients $A_p$ by direct calculation or by an appropriate regression, in particular a regression chosen from the group consisting of a linear regression and an exponential regression, from a sufficient number of pairs with $(\alpha_i, G_i)$ so as to model a variation curve $\alpha_i = f(G_i, A_p)$, Calculating the optimum slip $G^{Opt}$ by using a predetermined Invariant "Invt", Acting on the means for imparting a longitudinal force to the tire so as to maintain the slip at its optimum value $G^{Opt}$.

Of course, in the case of a vehicle with an internal combustion engine of a design which is common at present, the means for imparting a slip to the tire are essentially the brakes in a braking situation and are essentially the engine management system under a driving force. A person skilled in the art will have no difficulty in adapting the present invention to other vehicle designs, for example electric vehicles.

Here again, we desire to stress an aspect already mentioned: the invention as described hereabove does not preclude that the controller of the system is loaded by, in addition to the means described here, other programs embodying other slip control strategies, which may be more desirable in certain circumstances, e.g. in view of estimated or measured values of $(G_i, \mu_i)$ upon any particular activation of means to impart a slip to the tire.

In particular, a good approach for determining the Invariant is as follows:

$$Invt = \frac{\frac{\mu}{G}(G_{max})}{\frac{\mu}{G}(p \cdot G_{max})}, \qquad \text{See, Eq. (6)}$$

more particularly again with p having a value between 0.25 and 0.75, typically 0.5.

In a particular embodiment of the invention, the device for modulating the slip acts on the brake control. In another embodiment of the invention, the device for modulating the slip acts on the driving torque at the wheels.

It is proposed to create a new algorithm, particularly useful for a vehicle brake system, which enables the position of the coefficient of friction $\mu_{max}$ to be determined on the basis of the Invariant "Invt" presented above. As a reminder, such a system carries out an estimation of the coefficient of friction $\mu_{max}$, then chooses an optimum slip by virtue of a reference curve. It is proposed to replace these steps by what follows.

The implementation of this principle requires a few modifications in an ABS controller:

It is preferable for the calculation frequency to be above 40 Hz.

It is advisable preferably to regulate the triggering of the ABS so as to have the time to acquire a sufficiently large number of points for the calculation of the target to be reliable (representative).

It proves to be advantageous to eliminate the measurement points at a slip which is too low (corresponding for example to a slip less than 1%).

In order to obtain a very good accuracy on the slip G, it is advantageous to acquire the speed of the vehicle with a specific means and not through wheel speed data processing (GPS, ground observation, . . . )

With the new algorithm proposed above, the efficiency of the vehicle brake system will be very good over the entire range of tires usable realistically on a vehicle.

The new algorithm developed enables the system to adapt to any type of tire automatically without requiring, a priori, any additional sensor and any measurement in the tread of a tire. Moreover, this algorithm obviates the need for a fine adjustment for a type of tire chosen for a given vehicle.

As specified above, the method makes it possible to obtain results not only with measured values but also with estimated values. Information on the actual (and not estimated) forces Fx, Fy and Fz could make it possible to have a more precise target and/or to do plausibility checks and thus to improve the reliability of the vehicle brake system.

EXAMPLE 3

Analysis of the Functioning of a Tire in Terms of Drift, Lateral Force $F_y$ Developed (also Called Drift Thrust)

Another application is explained below. It involves characterizing the lateral force $F_y$ as a function of the drift angle $\delta$ of the tire (angle between the projection on the ground of the plane of the wheel and the vector velocity of the tire on the ground). An optimum drift angle $\delta^{Opt}$, for instance the drift angle at which the tire develops the maximum lateral force $F_y$ may be predetermined, and the lateral force $F_{max}$ may be predetermined. The maximum lateral force is critical for example for the equilibrium of a vehicle on cornering. This is why the tests of a tire in this functioning configuration are a preferred application of the invention. In this case, for example, the invention enables the implementation of a method for controlling the functioning of a tire including a phase for predicting the value of the drift angle $\delta$ of a tire where the lateral force is maximal and the production of a warning signal when the drift angle $\delta$ is close to $\delta^{Opt}$, or a method in which the drift angle $\delta$ is automatically controlled so as to maintain it at $\delta^{Opt}$, or else a method in which, in the event of the occurrence of the warning signal, the drift angle $\delta$ is reduced.

The relationship between the lateral force $F_y$ and the drift $\delta$ is of the same type as for $\mu$ and G in the previous section. Consequently, it is possible for example to determine the Invariant as follows:

$$Invt = \frac{\frac{F}{\delta}(\delta^{Opt})}{\frac{F}{\delta}(p \cdot \delta^{Opt})}.$$ See, Eq. (6)

Figure 3:
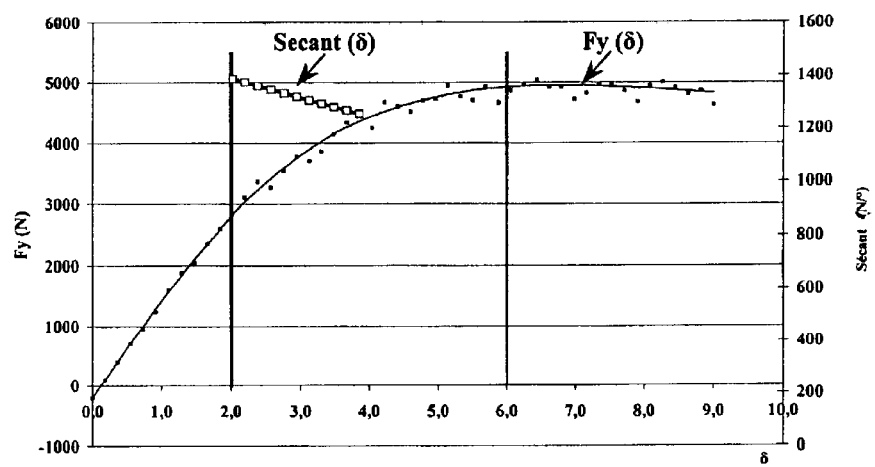
FIG. 3 is a curve of the variation of the drift thrust Fy(N) with respect to the drift angle δ and the variation at the same drift angle of the secant passing through the origin and the point of the previous curve at the same drift angle.

As far as p is concerned, just as explained above, its value is preferably between 0.25 and 0.75, for example it is 0.5, the reader being referred to the general presentation above as regards the consequences of the choice of the value of p. In this precise case, the magnitude "Invt" is notably higher; 0.8 has been obtained while retaining a minimum drift-angle threshold of 2°, in order to avoid values of too low a drift which interferes with the determination of the FIG. 3 is a curve of the variation of the drift thrust with respect to the drift angle and the variation at the same drift angle of the secant passing through the origin and the point of the previous curve at the same drift angle. For a Michelin Primacy 235/55R17 tire loaded at 5000 newton, without camber, the maximum drift angle estimated by the method is 5.5°, and the maximum estimated drift thrust is 5935 newton.

It is advisable next to determine the slope $\alpha_i$. This is done by direct calculation $\alpha_i = F_i / \delta$ (See, Eq. (2)) or a suitable regression is used, for example a linear regression as follows:

$$\Sigma_{\delta\delta} = \sum \delta_j^2, \quad \Sigma_{\delta F} = \sum \delta_j \cdot F_j, \quad \alpha_i = \frac{\Sigma_{\delta F}}{\Sigma_{\delta\delta}}$$ See, Eq. (8)

Or two particular coefficients $A_p$, A and B, are calculated by the following linear n, applied at "n" measured or estimated points:

$$A^{Lin} = \frac{n \cdot \sum \delta \cdot \alpha - \sum \delta \cdot \sum \alpha}{n \cdot \sum \delta^2 - (\sum \delta)^2},$$ See, Eq. (9)

$$B^{Lin} = \frac{\sum \alpha \cdot \sum \delta^2 - \sum \delta \cdot \alpha \cdot \sum \delta}{n \cdot \sum \delta^2 - (\sum \delta)^2}$$

Next, where a linear regression is being used, $\delta^{Opt}$ is calculated as follows:

$$\delta^{Opt} = -\frac{B^{Lin}}{A^{Lin}} \cdot \frac{1 - Invt}{1 - p \cdot Invt},$$ See, Eq. (12)

with $\alpha = A^{Lin} \cdot \delta + B^{Lin}$

By applying the algorithm, it is predetermined that the lateral force ($F_y$) will attain its maximum at a drift angle $\delta$ of about 6°. This information is valuable since it is then known that the tire no longer has much potential for transverse thrust before it starts to slip (saturation of the transverse thrusts, which may prevent a vehicle from turning).

If necessary, it is possible to carry on as far as the determination of the value of F corresponding to $\delta^{Opt}$, as follows, where $F^{coeff\_lin}$ is an experimentally adjusted coefficient:

$$F_{max} = F^{Coeff\_lin} \cdot \delta^{Opt} \cdot (A^{Lin} \cdot \delta^{Opt} + B^{Lin})$$ See, Eq. (14)

Or else, two particular coefficients $A_p$, the coefficients A and B, are calculated by the following exponential regression, applied at "n" measured or estimated points:

$$A^{Exp} = \frac{n \cdot \sum \delta \cdot Ln(\alpha) - \sum \delta \cdot \sum Ln(\alpha)}{n \cdot \sum \delta^2 - (\sum \delta)^2},$$ See, Eq. (10)

$$B^{Exp} = \frac{\sum Ln(\alpha) \cdot \sum \delta^2 - \sum \delta \cdot Ln(\alpha) \cdot \sum \delta}{n \cdot \sum \delta^2 - (\sum \delta)^2}$$ See, Eq. (11)

Next, where an exponential regression is being used, $\delta^{Opt}$ is calculated as follows:

$$\delta^{Opt} = \frac{Ln(Invt)}{p \cdot A^{Exp}},$$ See, Eq. (13)

with $\alpha = e^{A^{Exp} \cdot \delta + B^{Exp}}$

If necessary, it is possible to carry on as far as the determination of $F_{target}$ as follows, where $F^{coeff\_exp}$ is an experimentally adjusted coefficient:

$$F_{max} = F^{Coeff\_exp} \cdot \delta^{Opt} \cdot e^{A^{Exp} \cdot \delta^{Opt} + B^{Exp}}$$ See, Eq. (15)

EXAMPLE 3a

Use for Measuring or Testing Tires

Figure 14:
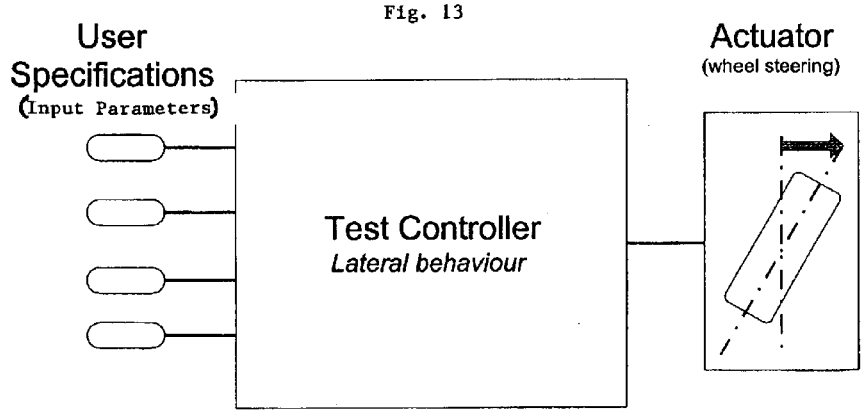
FIG. 14 is a diagrammatic representation of the control of a test machine in drift conditions.

In the tire industry, the invention may be applied to the testing or measuring of tires. Another aspect of the invention is therefore a method for testing a tire in terms of drift, illustrated diagrammatically in FIG. 14, comprising the following steps:

Causing the tire to roll on the ground (e.g., a road test, a test track, a test machine having a flat track or comprising a wheel), Applying a predetermined load $F_{Z1}$ to the tire, Applying a predetermined drift angle $\delta_i$ to the tire, such that the tire remains below the grip limit, and measuring or estimating the drift thrust $F_i$ corresponding to said drift angle $\delta_i$;

Repeating the previous steps for calculating at least one other pair "i" of values ($\delta_i$, $F_i$);

Determining the corresponding values of the slope $\alpha_i$ of the straight line passing through the origin and through ($\delta_i$, $F_1$);

Calculating coefficients $A_p$ by direct calculation or by an appropriate regression from a sufficient number of pairs ($\alpha_i$, $\delta_i$) so as to model a variation curve $\alpha_i = f(\delta_i, A_p)$;

Calculating a value of the drift angle $\delta^{Opt}$ by using a predetermined Invariant "Invt".

Likewise, the Invariant may be chosen by experimentally refining the test method. It may be advantageous, for example for choosing a first value of the Invariant during refinement, to determine the Invariant as follows:

$$Invt = \frac{\frac{F}{\delta}(\delta^{Opt})}{\frac{F}{\delta}(p \cdot \delta^{Opt})}, \qquad \text{See, Eq. (6)}$$

with p having a positive value less than 1.

In a manner similar to that described above, the two particular coefficients $A_p$, the coefficients A and B, may be calculated by a regression chosen from the group consisting of a linear regression and an exponential regression.

Once again, a value of between 0.25 and 0.75, typically 0.5, may be adopted as the value of p.

EXAMPLE 3b

Determination of the Maximum Possible Drift of a Vehicle on a Bend

In an application of the invention to the stability of a vehicle equipped with tires, the method for controlling the functioning of a tire proposed by the invention, including a phase for predicting the value of the drift angle $\delta$ of a tire (the drift angle $\delta$ is the angle between the projection on the ground of the plane of the wheel and the vector velocity of the vehicle on the ground) where the lateral force is maximal, enables a warning to be given to the driver if too close an approach is made to the maximum potential of the tire in terms of drift thrust, or, in a more advanced version integrated in a system for automatically controlling the stability of a vehicle, in the event of the occurrence of the warning signal, the vehicle speed is limited or reduced automatically.

The invention may also be applied to an active vehicle (having active steering on the rear and/or the front axle, or an active control of the body roll or any system acting on the lateral equilibrium of the vehicle, thus acting on the lateral thrust imposed on the tires), that is to say capable of reacting also according to commands coming from a system for automatically controlling the lateral stability of a vehicle.

In this regard, the invention thus extends to a system for controlling the stability of a vehicle having at least one tire intended to roll on the ground, the vehicle being equipped with a system for controlling a selected parameter (hereunder called parameter <<λ>>), depending on the technology used on the vehicle (for instance the parameter <<λ>> is the steering of the rear and front wheels for an active steering, or the parameter <<λ>> is the body roll for an active anti-roll, or the parameter <<λ>> is the braking force for a stability control through braking actuators . . . ) depending on the commands imparted by the vehicle driver to his control means and depending on the commands delivered by a path controller aimed at maintaining the functioning of the tire at a predetermined target value of the drift thrust $F_{target}$, that is to say, having a direct or indirect consequence on the drift angle of the tires in each axle, the path controller using at least one optimum value $\delta^{Opt}$ of the drift angle corresponding to the maximum value of the drift thrust $F_{target}$, the controlling including means for performing the following operations (operating on each axle—the share not being the same in the front and in the rear axle—and distinguishing the left and right tires are desirable, but the principle is exposed hereunder for only one tire, the skilled person being able to process for all the tires):

On each activation of the parameter <<λ>> control, for at least two different levels "i" of the tire drift angle, recording various values of $F_{Yi}$, and the associated drift angle $\delta_i$, Determining the slope $\alpha_i$ of the straight line passing through the origin and through $(\delta_i, F_{Yi})$, Calculating coefficients $A_p$ by direct calculation or by an appropriate regression, in particular a regression chosen from the group consisting of a linear regression and an exponential regression, from a sufficient number of pairs with $(\alpha_i, \delta_i)$ so as to model a variation curve $\alpha_i = f(\delta_i, A_p)$, Calculating the optimum value $\delta^{Opt}$ of the tire drift angle associated with the maximum value of the drift thrust $F_{target}$ by using a predetermined Invariant "Invt";

Producing a warning signal when the drift angle $\delta$ is close to $\delta^{Opt}$.

As already explained above, the optimum drift angle value $\delta^{Opt}$ is calculated by the modelling formula (above-mentioned variation curve) resulting from the choice of direct calculation or regression. In particular, a good approach for determining the Invariant is as follows:

$$Invt = \frac{\frac{F}{\delta}(\delta^{Opt})}{\frac{F}{\delta}(p \cdot \delta^{Opt})}, \qquad \text{See, Eq. (6)}$$

more particularly again with p having a value which is between 0.25 and 0.75, typically 0.5.

In a particular embodiment of this aspect of the invention, in the event of the occurrence of a warning signal, the system for controlling a selected parameter is acted upon so as to maintain the drift angle $\delta$ at the optimum value $\delta^{Opt}$. In another embodiment of this aspect, in the event of the occurrence of a warning signal, the vehicle speed is limited or reduced.

It should be emphasised, and this is important, that the aspects concerning the utilization of the coefficient of friction as a function of the slip, and the utilization of the drift thrust as a function of the drift angle, are not mutually exclusive, quite the contrary. Notably, it is advantageous for a system for automatically controlling the path of a vehicle to utilize these two aspects simultaneously. Thus, one aspect of the invention relates to a method for automatically controlling the functioning of a tire in a given configuration, aimed at maintaining the functioning of a tire at a predetermined value of the coefficient of friction $\mu$, comprising the following steps:

Determining estimations or measurements $(G_i, p_i)$ for a plurality of pairs "i" of values;

Calculating an estimation of the optimum slip of the tire $G^{Opt}$ as a function of the intrinsic physical characteristics of the tire and the existing actual functioning configuration;

Automatically controlling the configuration as a function of the difference between $G_{instantaneous}$ and $G^{Opt}$.

EXAMPLE 4

Tensile Tests on Metal Test Pieces

As another application case, mention may be made of the analysis of the extension of a test piece subjected to tensile stress as a function of the elongation (so as to avoid violent rupture of the piece by stopping the test just before rupture). In this case, the parameter X is the elongation; the maximum elongation is estimated from the measurements of the force and elongation at the start of the stressing, and the test is stopped at a chosen elongation close to but below the maximum elongation. In addition, the maximum possible force may be estimated.

What is claimed is:

1. A method for testing a tire in terms of slip comprising the following steps:
    (a) causing the tire to roll on a selected ground;
    (b) applying a predetermined load $F_{Z1}$ to the tire;
    (c) applying a predetermined slip to the tire;
    (d) measuring or estimating the longitudinal force $F_{X1}$ of the tire;
    (e) calculating a value of the coefficient of friction $\mu_1 = F_{X1}/F_{Z1}$;
    (f) repeating the previous steps for calculating at least one other value "i" of the coefficient of friction $\mu_i$ for at least one other pair "i" of stresses $F_{Xi}/F_{Zi}$ and measuring the associated slip $G_i$;
    (g) determining for each of the calculated values of the coefficient of friction the slope $\alpha_i$ of the straight line passing through the origin and through $(G_i, \mu_i)$;
    (h) calculating coefficients $A_p$ by direct calculation or by an appropriate regression from a sufficient number of pairs with $(\alpha_i, G_i)$ so as to model a variation curve $\alpha_i = f(G_i, A_p)$; and
    (i) calculating an optimum slip enabling a predetermined value of the coefficient of friction $G^{Opt}$ to be attained, by using a predetermined Invariant "Invt".

2. A test method according to claim 1, in which the Invariant is determined as follows:

$$Invt = \frac{\frac{\mu}{G}(G_{max})}{\frac{\mu}{G}(p \cdot G_{max})},$$

with p having a positive value less than 1.

3. A test method according to claim 1, in which the Invariant "Invt" is used as an adjustment parameter to refine the method.

4. A method for testing a tire in terms of drift comprising the following steps:
    (a) causing the tire to roll on the ground;
    (b) applying a predetermined load $F_{Z1}$ to the tire;
    (c) applying a predetermined drift angle $\delta_i$ to the tire, such that the tire remains below the grip limit, and measuring or estimating the drift thrust $F_i$ corresponding to said drift angle $\delta_i$;
    (d) repeating the previous steps for calculating at least one other pair "i of values $(\delta_i, F_i)$;
    (e) determining the corresponding values of the slope $\alpha_i$ of the straight line passing through the origin and through $(\delta_i, F_i)$;
    (f) calculating coefficients $A_p$ by direct calculation or by an appropriate regression from a sufficient number of pairs $(\alpha_i, \delta_i)$ so as to model a variation curve $\alpha_i = f(\delta_i, A_p)$; and
    (g) calculating a value of the drift angle $\delta^{Opt}$ by using a predetermined Invariant "Invt".

5. A test method according to claim 4, in which the Invariant is determined as follows:

$$Invt = \frac{\frac{F}{\delta}(\delta^{Opt})}{\frac{F}{\delta}(p \cdot \delta^{Opt})},$$

with p having a positive value less than 1.

6. A test method according to claim 4, in which the Invariant "Invt" is used as an adjustment parameter to refine the method.

7. A test method according to claim 1, 2, 3, 4, or 5, in which the coefficients $A_p$ are calculated by a regression chosen from the group consisting of a linear regression and an exponential regression.

8. A test method according to claim 1, 2, 3, 4, or 5, for automatically controlling the drift angle $\delta$ of a tire, in which the value of p is between 0.25 and 0.75.

9. A test method according to claim 2, or 5, for automatically controlling the drift angle $\delta$ of a tire in which p is 0.5.

10. A test method according to claim 2, in which two particular coefficients $A_p$, the coefficients A and B, are calculated by the following linear regression, applied to "n" measured or estimated points $(G_i, \mu_i)$:

$$A^{Lin} = \frac{n \cdot \sum G \cdot \alpha - \sum G \cdot \sum \alpha}{n \cdot \sum G^2 - (\sum G)^2},$$

$$B^{Lin} = \frac{\sum \alpha \cdot \sum G^2 - \sum G \cdot \alpha \cdot \sum G}{n \cdot \sum G^2 - (\sum G)^2}.$$

11. A test method according to claim 2, in which two particular coefficients $A_p$, the coefficients A and B, are calculated by the following exponential regression, applied to "n" measured or estimated points $(G_i, \mu_i)$:

$$A^{Exp} = \frac{n \cdot \sum G \cdot \mathrm{Ln}(\alpha) - \sum G \cdot \sum \mathrm{Ln}(\alpha)}{n \cdot \sum G^2 - (\sum G)^2},$$

$$B^{Exp} = \frac{\sum \mathrm{Ln}(\alpha) \cdot \sum G^2 - \sum G \cdot \mathrm{Ln}(\alpha) \cdot \sum G}{n \cdot \sum G^2 - (\sum G)^2}.$$

12. A test method according to claim 10, in which $G^{Opt}$ is calculated as follows:

$$G^{Opt} = -\frac{B^{Lin}}{A^{Lin}} \cdot \frac{1 - Invt}{1 - p \cdot Invt},$$

with $\alpha = A^{Lin} \cdot G + B^{Lin}$

13. A test method according to claim 11, in which $G^{Opt}$ is calculated as follows:

$$G^{Opt} = \frac{\mathrm{Ln}(Invt)}{p \cdot A^{Exp}}, \text{ with } \alpha = e^{A^{Exp} \cdot G + B^{Exp}}.$$

14. A test method according to claim 10, in which in addition the value of $\mu$ corresponding to $G^{Opt}$ is determined as follows:

$$\mu = \mu^{Coeff\_lin} \cdot G^{Opt} \cdot (A^{Lin} \cdot G^{Opt} + B^{Lin})$$

15. A test method according to claim 11, in which in addition $\mu_{max}$ is determined as follows:

$$\mu_{max}=\mu^{Coeff\_exp} \cdot G^{Opt} \cdot e^{A^{Exp} \cdot G^{Opt}+A^{Exp}}$$

16. A test method according to claim 4, in which two particular coefficients $A_p$, the coefficients A and B, are calculated by the following linear regression, applied to "n" measured or estimated points ($\delta_i$, $F_i$):

$$A^{Lin} = \frac{n \cdot \sum \delta \cdot \alpha - \sum \delta \cdot \sum \alpha}{n \cdot \sum \delta^2 - (\sum \delta)^2},$$

$$B^{Lin} = \frac{\sum \alpha \cdot \sum \delta^2 - \sum \delta \cdot \alpha \cdot \sum \delta}{n \cdot \sum \delta^2 - (\sum \delta)^2}.$$

17. A test method according to claim 4, in which two particular coefficients $A_p$, the coefficients A and B, are calculated by the following exponential regression, applied to "n" measured or estimated points ($\delta_i$, $F_i$):

$$A^{Exp} = \frac{n \cdot \sum \delta \cdot \mathrm{Ln}(\alpha) - \sum \delta \cdot \sum \mathrm{Ln}(\alpha)}{n \cdot \sum \delta^2 - (\sum \delta)^2},$$

$$B^{Exp} = \frac{\sum \mathrm{Ln}(\alpha) - \sum \delta^2 - \sum \delta \cdot \mathrm{Ln}(\alpha) \cdot \sum \delta}{n \cdot \sum \delta^2 - (\sum \delta)^2}.$$

18. A test method according to claim 16, which $\delta^{Opt}$ is calculated as follows:

$$\delta^{Opt} = -\frac{B^{Lin}}{A^{Lin}} \cdot \frac{1 - Invt}{1 - p \cdot Invt},$$

with $\alpha = A^{Lin} \cdot \delta + B^{Lin}$

19. A test method according to claim 17, in which $\delta^{Opt}$ is calculated as follows:

$$\delta^{Opt} = \frac{\mathrm{Ln}(Invt)}{p \cdot A^{Exp}}, \text{ with } \alpha = e^{A^{Exp} \cdot \delta + B^{Exp}}.$$

20. A test method according to claim 18, in which in addition $F^{Target}$ is determined as follows:

$$F^{Target} = F^{Coeff\_lin} \cdot \delta^{Opt} \cdot (A^{Lin} \cdot \delta^{Opt} + B^{Lin})$$

21. A test method according to claim 19, in which in addition $F^{Target}$ is determined as follows:

$$F^{Target} = F^{Coeff\_exp} \cdot \delta^{Opt} \cdot e^{A^{Exp} \cdot \delta^{Opt} + B^{Exp}}$$

* * * * *

UNITED STATES PATENT AND TRADEMARK OFFICE
CERTIFICATE OF CORRECTION

PATENT NO. : 6,923,050 B2
APPLICATION NO. : 10/460007
DATED : August 2, 2005
INVENTOR(S) : Georges Levy et al.

It is certified that error appears in the above-identified patent and that said Letters Patent is hereby corrected as shown below:

ON TITLE PAGE (56) PATENT DOCUMENTS

After "Sakai Tomotsugu", "meetig," should read --meeting,--.

COLUMN 4

Line 20, "$P^{target}$" should read --$P^{Target}$--.

COLUMN 10

Line 53, "(15)" should read --Eq. (15)--; and
Line 67, "$(1/0.75=Y^{Coefflin}$" should read --$(1/0.75=Y^{coeff\_lin}$--.

COLUMN 11

Line 1, "$1/1.19=Y^{Coeff\_Exp}$" should read --$1/1.19=Y^{coeff\_Exp}$--.

COLUMN 13

Line 66, "$F_{x1}$" should read --$F_{X1}$--.

COLUMN 14

Line 15, "$\mu_1=F_{x1}/$" should read --$\mu_1=F_{X1}/$--;
Line 16, "$F_{z1}$" should read --$F_{Z1}$--;
Line 20, "$F_{x1}/F_{z1}$" should read --$F_{X1}/F_{Z1}$--; and
Line 34-62 should be deleted.

COLUMN 15

Line 25, "$F_x$" should read --$F_X$--.

COLUMN 16

Line 67, "$F_{max}$" should read --$F_{ymax}$--.

COLUMN 17

Line 34, "of the" should read --of the secant.--; and
Line 55, "linear n," should read --linear regression,--.

UNITED STATES PATENT AND TRADEMARK OFFICE
CERTIFICATE OF CORRECTION

PATENT NO. : 6,923,050 B2
APPLICATION NO. : 10/460007
DATED : August 2, 2005
INVENTOR(S) : Georges Levy et al.

It is certified that error appears in the above-identified patent and that said Letters Patent is hereby corrected as shown below:

COLUMN 20

Line 54, "$(G_i, p_i)$" should read --$(G_i, \mu_i)$--.

COLUMN 21

Line 63, "$A_p$ );" should read --$A_p$);--.

COLUMN 23

Line 3, " $\mu_{max} = \mu^{Coeff\_exp} \cdot G^{Opt} \cdot e^{A^{Exp} \cdot G^{Opt} + A^{Exp}}$ " should read -- $\mu_{max} = \mu^{Coeff\_exp} \cdot G^{Opt} \cdot e^{A^{Exp} \cdot G^{Opt} + B^{Exp}}$ --.

Signed and Sealed this

Third Day of October, 2006

JON W. DUDAS
*Director of the United States Patent and Trademark Office*